(12) United States Patent
Guenzel

(10) Patent No.: US 9,327,775 B1
(45) Date of Patent: May 3, 2016

(54) ACTIVE VEHICLE FASCIA

(71) Applicant: GM GLOBAL TECHNOLOGY OPERATIONS LLC, Detroit, MI (US)

(72) Inventor: Jason W. Guenzel, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/582,496

(22) Filed: Dec. 24, 2014

(51) Int. Cl.
*B62D 35/00* (2006.01)

(52) U.S. Cl.
CPC ..................................... *B62D 35/00* (2013.01)

(58) Field of Classification Search
CPC .... B62D 35/001; B62D 35/007; B61D 17/02; B61D 17/06
USPC ........... 296/180.1, 180.2, 180.3, 180.4, 180.5
See application file for complete search history.

(56) References Cited

U.S. PATENT DOCUMENTS

| | | | |
|---|---|---|---|
| 6,846,035 B2 * | 1/2005 | Wong ................... | B62D 35/001 296/180.1 |
| 8,925,997 B2 * | 1/2015 | Hjelm .................. | B62D 35/001 180/903 |
| 2009/0236872 A1 * | 9/2009 | Wood .................... | B62D 37/02 296/180.1 |

OTHER PUBLICATIONS http://www.autoblog.com/2014/10/03/renault-eolab-concept-paris-2014/.

* cited by examiner

*Primary Examiner* — Joseph D Pape
(74) *Attorney, Agent, or Firm* — Quinn Law Group, PLLC

(57) ABSTRACT

A vehicle includes a vehicle body having a first body end configured to face oncoming ambient airflow when the vehicle is in motion relative to a road surface, and also having a second body end opposite of the first body end. The vehicle also includes first and second lateral body sides disposed generally parallel to one another. The vehicle additionally includes first and second side panels mounted to the vehicle body and configured to selectively deploy into ambient airflow aft of the second body end to become positioned along the respective first and second lateral body sides and retract from the ambient airflow. The first and second side panels provide an active lengthening of the vehicle body aft of the second body end to thereby reduce aerodynamic drag when both side panels are deployed and positioned along the respective first and second lateral body sides.

18 Claims, 5 Drawing Sheets

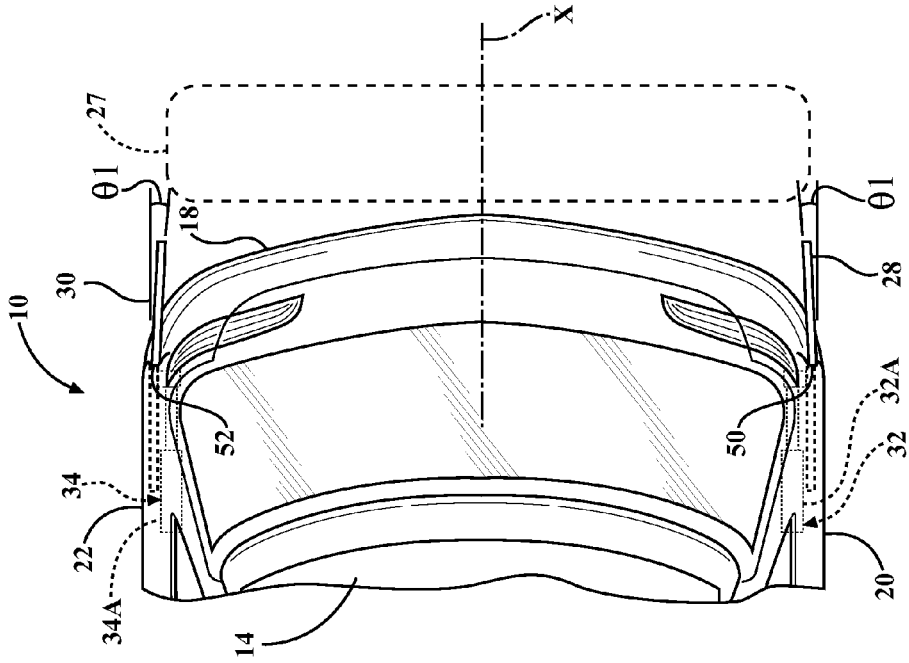
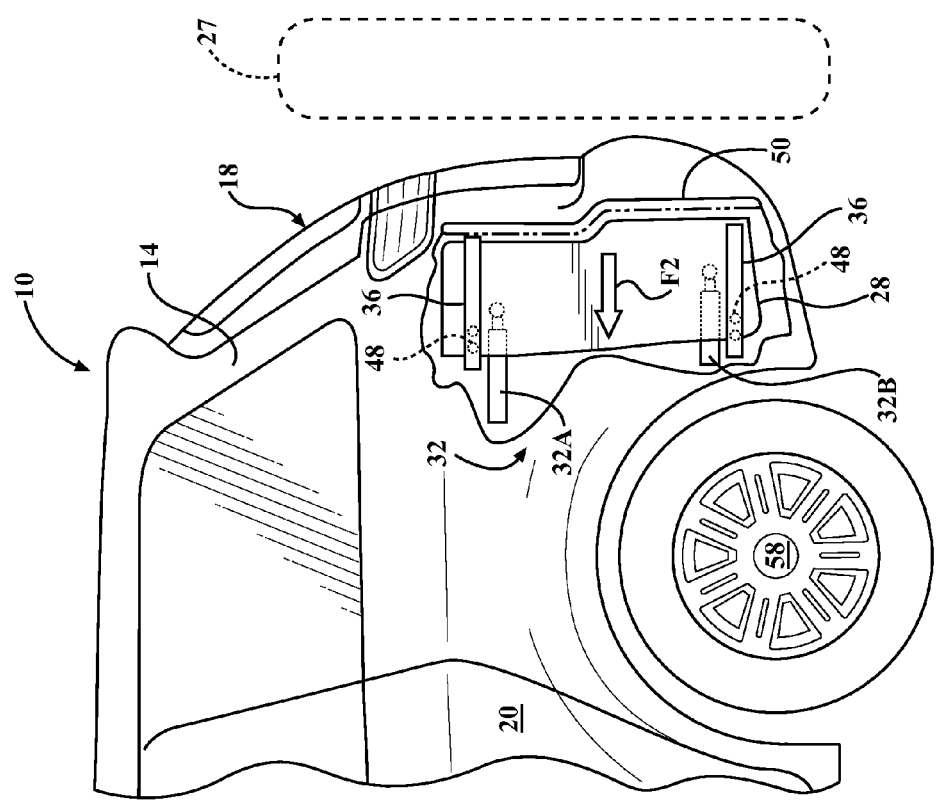

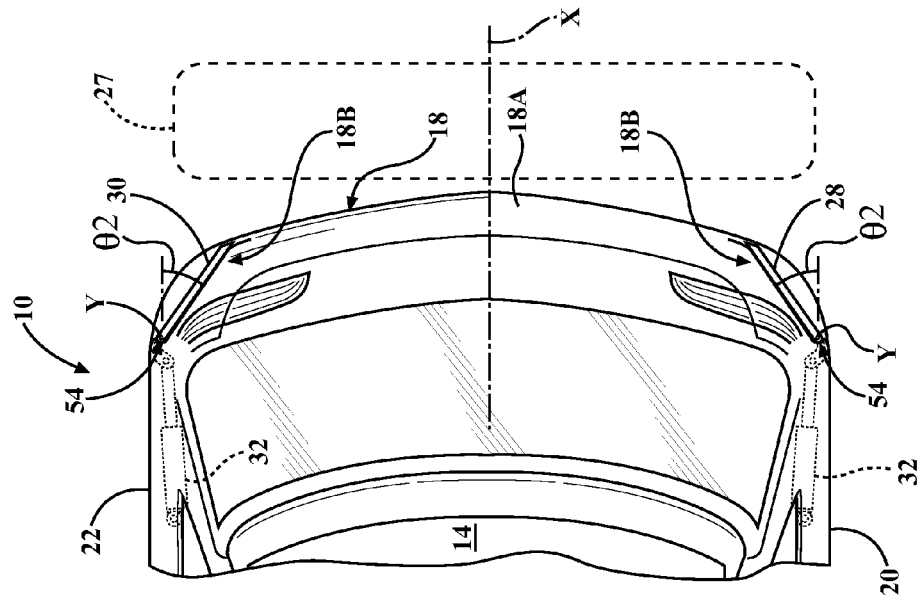
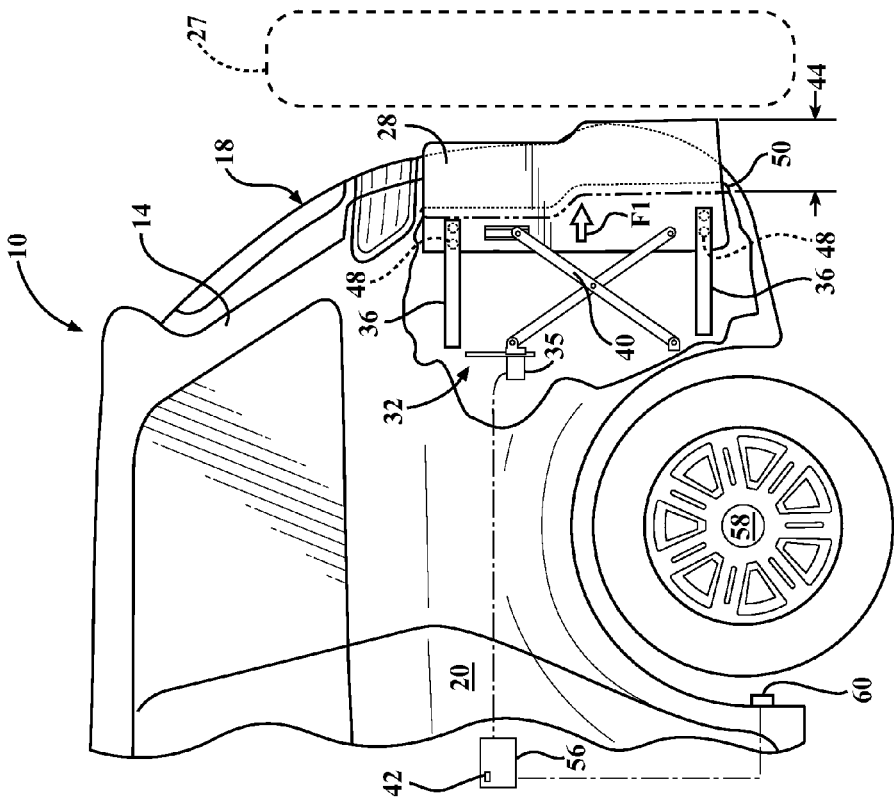

ACTIVE VEHICLE FASCIA

TECHNICAL FIELD

The disclosure relates to an active motor vehicle fascia for enhancement of aerodynamics of the vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

SUMMARY

A vehicle includes a vehicle body having a first body end configured to face oncoming ambient airflow when the vehicle is in motion relative to a road surface, and also having a second body end opposite of the first body end. The vehicle also includes a first lateral body side between the first body end and the second body end, and a second lateral body side between the first end and the second body end and disposed generally parallel to the first lateral body side. The vehicle additionally includes a first side panel mounted to the vehicle body that selectively deploys into the ambient airflow aft of the second body end to achieve a position along the first lateral body side, and that retracts from the ambient airflow. The vehicle also includes a second side panel mounted to the vehicle body and configured to selectively deploy into the ambient airflow aft of the second body end to achieve a position along the second lateral body side, and that retracts from the ambient airflow. The first side panel and the second side panel provide an active lengthening of the vehicle body aft of the second body end to thereby reduce aerodynamic drag when each of the first and second side panels is deployed and positioned along the respective first and second lateral body sides.

The vehicle may also include a first device that selectively deploys and retracts the first side panel, and a second device that selectively deploys and retracts the second side panel.

Each of the first and second devices may be a linear actuator or as an electric motor.

Each of the first and second devices may include a multiple-lever linkage that applies a force to the respective first and second side panels.

Each of the first and second devices may deploy the respective side panel above a predetermined velocity of the vehicle.

Each of the first and second devices may extend the respective side panel for a predetermined distance past the second body end.

The vehicle may additionally include a first fascia arranged at the first body end and a second fascia arranged at the second body end. In such a case, the first fascia may direct the oncoming airflow around the first and second lateral body sides, and each of the first and second side panels may selectively extend out of and retract into the second fascia.

Each of the first and second devices may be enclosed by the second fascia.

Each of the first and second side panels may be a pivotably mounted flap, such as via hinges. Additionally, each of the first and second side panels may be positioned flush with an external surface of the second fascia when retracted, and configured to swing or pivot out to the respective positions along the first and second lateral body sides.

The vehicle may also include a first track and a second track positioned at the respective first and second lateral body sides. Each of the first and second side panels may be guided by the respective first and second tracks.

The vehicle may additionally include an electronic controller that regulates the first and second devices to thereby selectively deploy and retract the first and second side panels.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic left side view of the vehicle shown in FIG. 2 with the respective selectively deployable side panel being illustrated in the retracted state.

FIG. 4 is a schematic top view of the vehicle including the selectively deployable side panels shown in FIG. 1, and having a device according to one embodiment that is configured to operate the respective side panel, with the deployable side panels being illustrated in an extended or deployed state.

FIG. 7 is a schematic left side view of the vehicle shown in FIG. 6, with the respective selectively deployable side panel being illustrated in the extended or deployed state.

FIG. 8 is a schematic top view of the vehicle including the selectively deployable side panels shown in FIG. 1, wherein the side panels are configured as pivotably mounted flaps and are illustrated in a retracted state.

DETAILED DESCRIPTION

Figure 1:
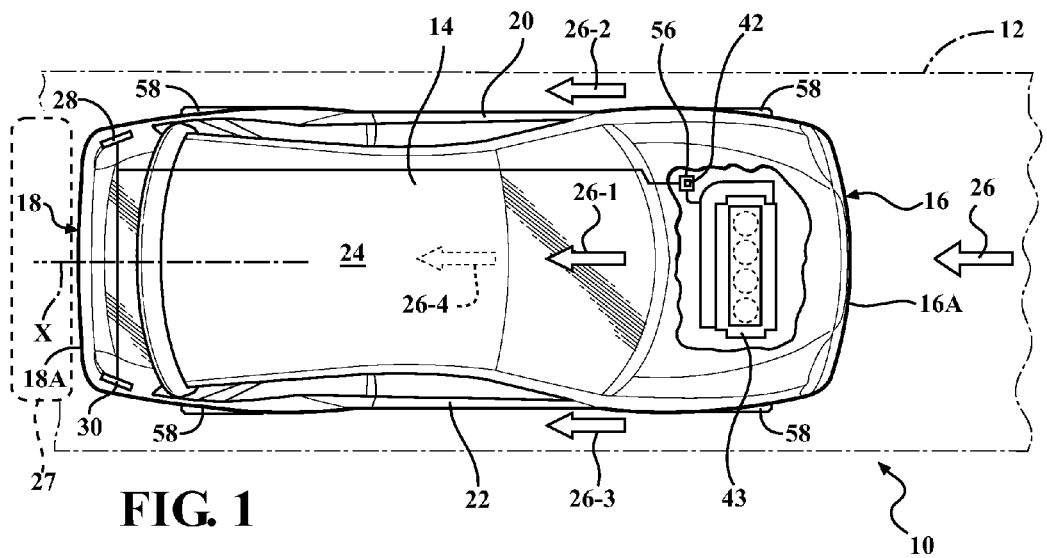
FIG. 1 is a schematic top view of a vehicle having selectively deployable side panels.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown). The left side 20 and right side 22 are disposed generally parallel to each other and with respect to a virtual longitudinal axis X of the vehicle 10, and span the distance between the front end 16 and the rear end 18. A passenger compartment (not shown) of the vehicle 10 is generally bounded by the front and rear ends 16, 18 and the left and right sides of the body 14. As understood by those skilled in the art, the front end 16 is configured to face oncoming ambient airflow 26 when the vehicle is in motion relative to the road surface 12.

The ambient airflow 26 passes around the vehicle body 14 and splits into respective first airflow portion 26-1, second airflow portion 26-2, third airflow portion 26-3, and fourth airflow portion 26-4, that eventually rejoin in a wake area or recirculating airflow region 27 immediately behind the rear end 18 of the moving vehicle 10. Specifically, the first airflow portion 26-1 passes over the top body portion 24, second airflow portion 26-2 passes over the left side 20, third airflow portion 26-3 passes over the right side 22, and fourth airflow portion 26-4 passes under the vehicle body 14, between the vehicle body 14 and the road surface 12. As understood by those skilled in the art, the recirculating airflow region 27 is generally caused at elevated vehicle speeds by the flow of surrounding air around the six body sides of the vehicle body 14.

The vehicle 10 also includes a first side panel 28 and a second side panel 30. The first side panel 28 is mounted to the vehicle body 14 and configured to selectively deploy into the ambient airflow 26 aft of the rear end 18, i.e., into the recirculating airflow region 27, to achieve a position along the left side 20 of the body and retract from the ambient airflow. The second side panel 30 is similarly mounted to the vehicle body 14 and configured to selectively deploy into the ambient airflow 26 aft of the rear end 18 to achieve a position along the right side 22 and retract from the ambient airflow. When the first side panel 28 and the second side panel 30 are thus deployed, the first and second side panels become positioned "generally parallel" with respect to one another. The term "generally parallel" as used herein with respect to the positioning of the deployed first and second side panels 28, 30 is intended to include an angle $\theta1$ (shown in Figure relative to the virtual longitudinal axis X of the vehicle 10 and relative to the respective left and right sides 20, 22. The $\theta1$ may be selected empirically for aerodynamic performance improvement through testing in a wind tunnel or through computational analysis. For aerodynamic drag optimization, the angle $\theta1$ may be in the range of 0-10 degrees, and more specifically in the range of 6-8 degrees.

When each of the first and second side panels 28, 30 is deployed and positioned along the respective left and right sides 20, 22, the first side panel 28 and the second side panel 30 provide an active lengthening of the vehicle body 14 at the respective left and right sides 20, 22 aft of the rear end 18 to thereby reduce aerodynamic drag. The above-noted angle $\theta1$ at each of the deployed first and second side panels 28, 30 would generate an effective taper of the extended or lengthened vehicle body 14. Each of the first and second side panels 28, 30 may be formed from a suitably rigid but low mass material, such as an engineered plastic or aluminum, and may additionally include stiffening ribs for enhanced structural stability. The deployment of the first and second side panels 28, 30 may also be selectively effected to aid vehicle handling, such as countering a yaw moment of the vehicle 10 in order to maintain the vehicle on its intended path. Additionally, the deployment of the first and second side panels 28, 30 may be selectively effected to maintain vehicle contact with the road surface 12 at elevated speeds by countering aerodynamic lift of the vehicle 10.

Figure 5:
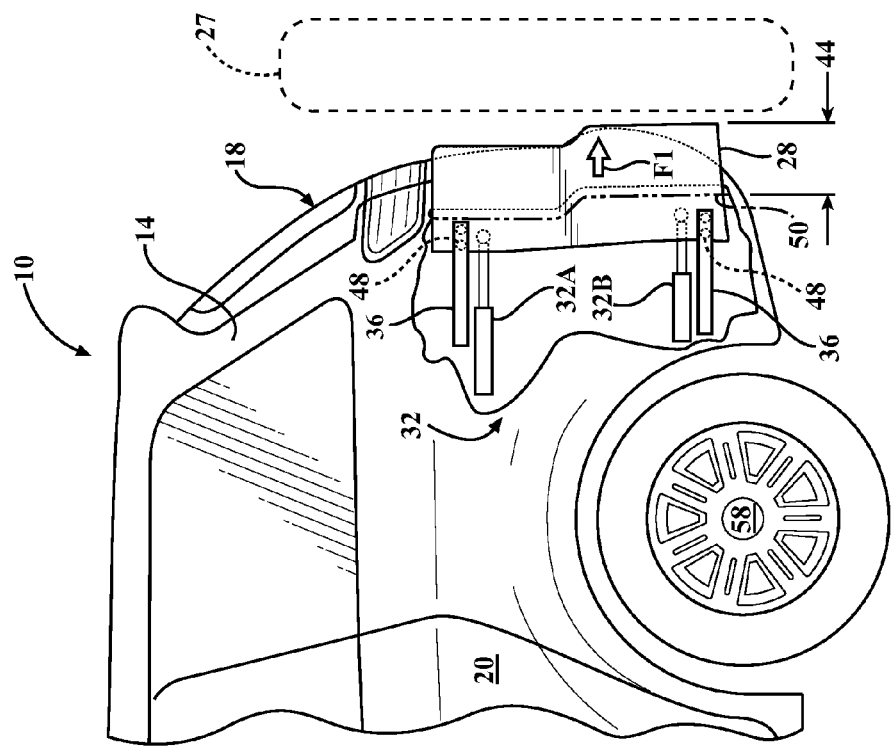
FIG. 5 is a schematic left side view of the vehicle shown in FIG. 4 with the respective selectively deployable side panel being illustrated in the extended or deployed state.

The vehicle 10 also includes a first device 32 configured to selectively deploy and retract the first side panel 28 and a second device 34 configured to selectively deploy and retract the second side panel 30. The first and second devices 32, 34 may include linear actuators (shown in FIG. 2). Each of the first and second devices 32, 34 may include at least one respective linearly-extending actuator 32A, 34A (as shown in FIG. 4), which may, for example, be a fluidly actuated device, or configured as a servomotor or a solenoid. Additionally, each of the first and second devices 32, 34 may include a plurality of individual actuators, such as two individual actuators 32A and 32B that are shown on the left side 20 of the vehicle body 14 in FIGS. 3 and 5. Although not shown, two individual actuators, similar to individual actuators 32A and 32B, may likewise be used on the right side 22 of the vehicle body 14. The first and second devices 32, 34 may be configured to apply a force F1 (shown in FIG. 5) to the respective first and second side panels 28, 30 for selectively extending and an opposite force F2 (shown in FIG. 3) for retracting the first and second side panels. The first and second devices 32, 34 may be controlled via a dedicated controller or via an electronic control unit that will be discussed in detail below.

Figure 6:
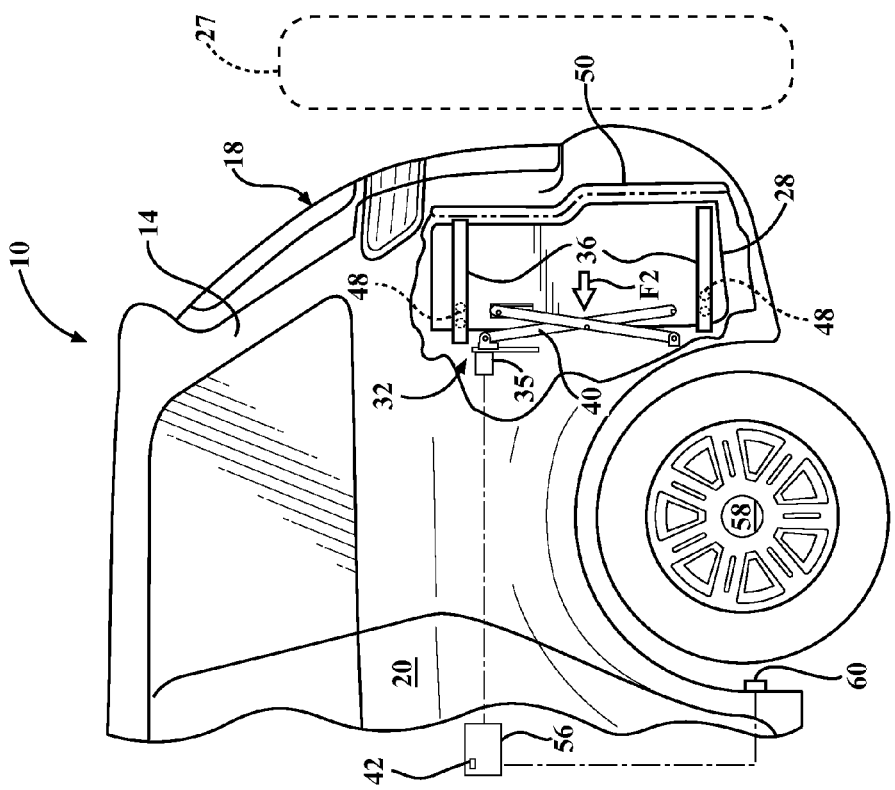
FIG. 6 is a schematic left side view of the vehicle shown in FIG. 5, and having a device according to another embodiment that is configured to operate the respective side panel, with the deployable side panel being disposed in a retracted state.

Alternatively, each of the first and second devices 32, 34 may include an electric motor 35, as shown in FIGS. 6 and 7. With resumed reference to FIG. 2, a first track or channel 36 and a second track or channel 38 may be arranged proximate to the rear end 18 at the respective left and right sides 20, 22 of the vehicle body 14. The first side panel 28 may be slidably mounted to and guided by at least one first track 36, while the second side panel 30 may be similarly slidably mounted to and guided by at least one second track 38. As shown in FIGS. 6 and 7, each of the first and second devices 32, 34 may additionally include a multiple-lever linkage 40. The multiple-lever linkage 40 may be configured to apply the force F1 (shown in FIG. 7) to the respective first and second side panels 28, 30 for selectively extending and the opposite force F2 (shown in FIG. 6) for retracting the first and second side panels.

The first and second devices 32, 34 are configured to deploy or extend the respective side panels 28, 30 above a predetermined velocity 42 of the vehicle 10 and retract the panel below the same predetermined vehicle velocity 42, or some other specifically identified vehicle velocity. The predetermined vehicle velocity 42 may be selected empirically through testing in a wind tunnel or through a computational method. The predetermined vehicle velocity 42 determined by any of the appropriate methods may identify the speed of vehicle 10 above which an enhanced aerodynamic profile of the vehicle body 14 imparts a desired benefit to vehicle efficiency. The enhanced aerodynamic profile of the vehicle body 14 may provide a benefit with respect to energy efficiency in a vehicle powered by an internal combustion engine 43 (shown in FIG. 1), a hybrid-electric powertrain (not shown), or other alternative types of powerplants. Additionally, the first and second devices 32, 34 may be configured to extend the respective panel 28, 30 for a predetermined distance 44 past the rear end 18 such that the extension of the panel provides the desired aerodynamic benefit, i.e., drag reduction on the vehicle body 14.

The side panels 28, 30 may be supported relative to the respective track 36, 38 via a number of bearings 48. As shown in FIGS. 3, 5, 6, and 7, the side panel 28 may be supported relative to the respective track 36 via bearings 48 on the left side 20 of the vehicle body 14. Although not shown, the side panel 30 may be similarly supported relative to the respective track 38 via a number of bearings 48. Bearings 48 may be configured as ball or roller bearing type. At least one bearing 48 may be used to support each of the side panels 28, 30 with respect to the respective track 36, 38. Bearings 48 are intended to facilitate reduced friction during the extension and retraction of the side panels 28, 30 and permit controlled and predictable operation of the respective panel at the predetermined vehicle velocity 42 and over the predetermined distance 44.

Figure 2:
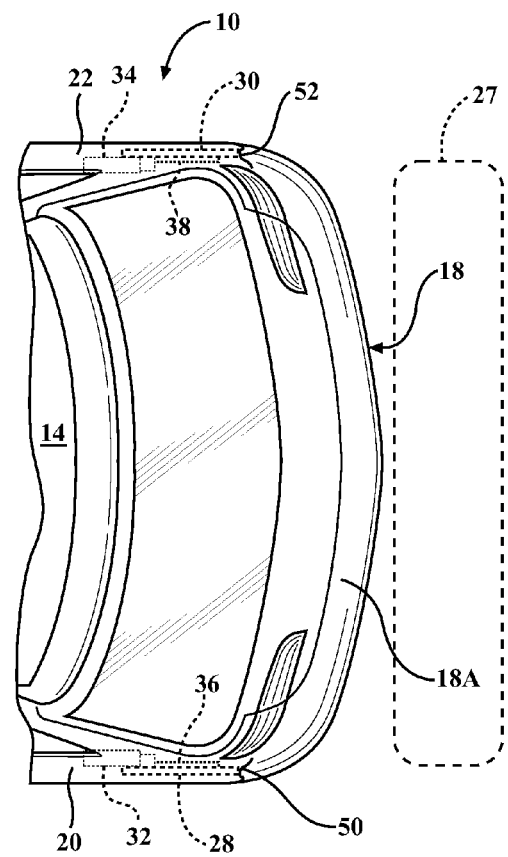
FIG. 2 is a schematic top view of the vehicle including the selectively deployable side panels shown in FIG. 1, the deployable side panels being illustrated in a retracted state.
Figure 9:
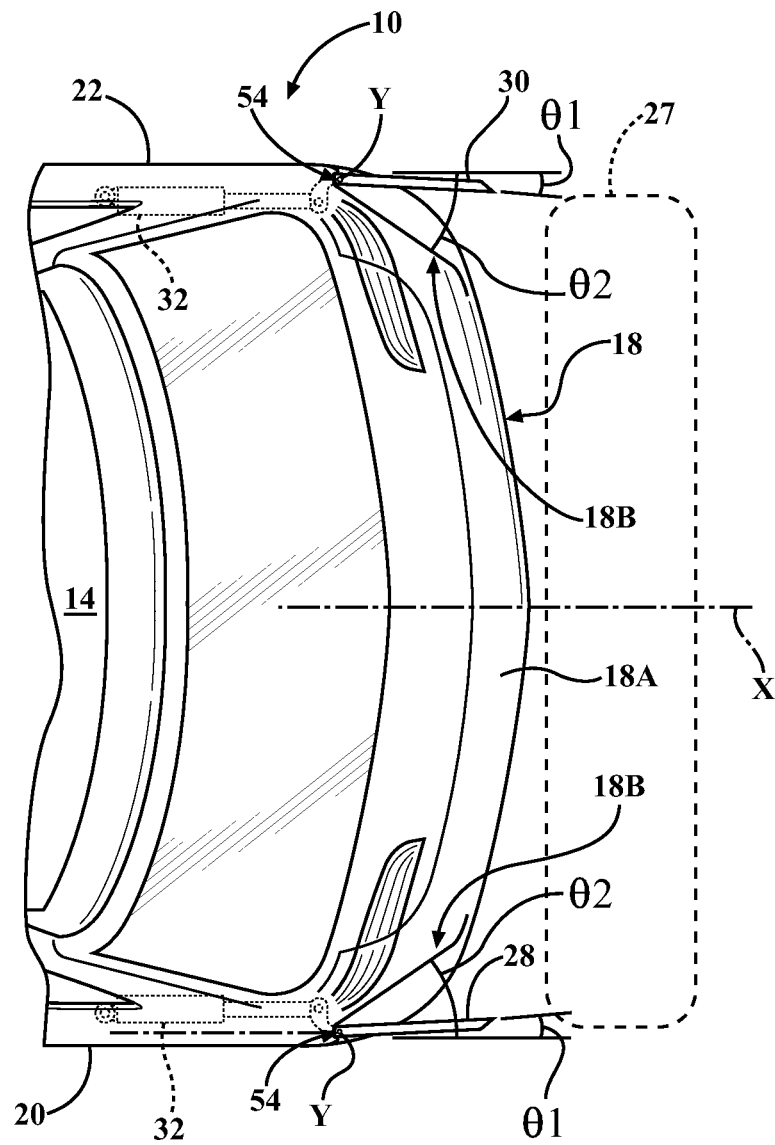
FIG. 9 is a schematic top view of the vehicle including the selectively deployable side panels shown in FIG. 8, with the deployable side panels being illustrated in a deployed state.

The vehicle 10 includes a first fascia 16A arranged at the front end 16 and a second fascia 18A arranged at the rear end 18, as shown in FIG. 1. The first fascia 16A directs the oncoming airflow 26 around each of the left and right sides 20, 22. Each of the first and second side panels 28, 30 may selectively extend out of and retract into specifically configured slots 50 and 52 in the second fascia 18A, as shown in FIG. 2. Each of the first and second devices 32, 34 may be enclosed by the second fascia 18A and hidden from view when observed from outside of the vehicle 10. Alternatively, each of the first and second side panels 28, 30 may be configured as an individual flap pivotably mounted on a respective hinge 54 defining an axis Y, as shown in FIGS. 8 and 9. The axis Y defined by each hinge 54 is generally perpendicular to the longitudinal axis X. Each of the first and second side panels 28, 30 configured as an individual flap is positioned flush with an external surface 18B of the second fascia 18A when the respective side panel is retracted. Each external surface 18B may be positioned at an angle θ2 relative to the virtual longitudinal axis X, such that the initial, retracted position of the first and second side panels 28, 30 is arranged at the angle θ2. Also, in such an embodiment, each of the first and second side panels 28, 30 may be configured to swing or pivot out about the axis Y to the respective deployed positions along the left and right sides 20, 22. Furthermore, the deployed position of the first and second side panels 28, 30 configured as individual flaps may be generally parallel, and include the angle θ1 as described above, relative to the virtual longitudinal axis X of the vehicle 10 and relative to the respective left and right sides 20, 22.

As noted above, the vehicle 10 may include an electronic controller 56 (shown in FIG. 1). The controller 56 may be configured to regulate the first and second devices 32, 34 to thereby selectively deploy and retract the first and second side panels 28, 30 at predetermined vehicle velocities, such as at the predetermined vehicle velocity 42. Actual velocity of the vehicle 10 relative to the road surface 12 may be detected at wheels 58 via appropriate sensor(s) 60 (shown in FIGS. 6 and 7) by known methods and communicated to the controller 56. The controller 56 may be configured to selectively extend the first and second side panels 28, 30 for the predetermined distance 44 at the predetermined vehicle velocity 42 and for another, distinct predetermined distance (not shown) at another predetermined vehicle velocity. In other words, the controller 56 may be programmed with multiple stages of extension for the first and second side panels 28, 30, wherein the distance the panels are extended is dependent on vehicle velocity. The controller 56 may be a dedicated controller or a central control unit configured to regulate various systems of the vehicle 10 in response to vehicle operating conditions and commands from a vehicle operator.

In order to appropriately control operation of the first and second side panels 28, 30, the controller 56 includes a memory, at least some of which is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 56 may also include a floppy disk, a flexible disk, hard disk, magnetic tape, any other magnetic medium, a CD-ROM, DVD, any other optical medium, etc. The controller 56 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 56 or accessible thereby may be stored in the memory and automatically executed to provide the required functionality.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body having a first body end configured to face oncoming ambient airflow when the vehicle is in motion relative to a road surface, and also having a second body end opposite of the first body end;
   a first lateral body side spanning a distance between the first body end and the second body end;
   a second lateral body side spanning the distance between the first body end and the second body end and disposed generally parallel to the first lateral body side;
   a first fascia arranged at the first body end, wherein the first fascia directs the oncoming ambient airflow around the first and second lateral body sides;
   a second fascia arranged at the second body end;
   a first side panel mounted to the vehicle body and configured to selectively deploy into ambient airflow aft of the second body end in a position along the first lateral body side, and to retract from the ambient airflow; and
   a second side panel mounted to the vehicle body and configured to selectively deploy into the ambient airflow aft of the second body end in a position along the second lateral body side, and to retract from the ambient airflow;
   wherein the first side panel and the second side panel provide an active lengthening of the vehicle body aft of the second body end to thereby reduce aerodynamic drag when each of the first and second side panels is deployed and positioned along the respective first and second lateral body sides; and
   wherein each of the first and second side panels selectively extends out of and retracts into the second fascia.

2. The vehicle according to claim 1, further comprising a first device configured to selectively deploy and retract the first side panel and a second device configured to selectively deploy and retract the second side panel.

3. The vehicle according to claim 2, wherein each of the first and second devices is a linear actuator.

4. The vehicle according to claim 2, wherein each of the first and second devices is an electric motor.

5. The vehicle according to claim 2, wherein each of the first and second devices includes a multiple-lever linkage configured to apply a force to the respective first and second side panels.

6. The vehicle according to claim 2, wherein each of the first and second devices is configured to deploy the respective first and second side panels above a predetermined velocity of the vehicle.

7. The vehicle according to claim 2, wherein each of the first and second devices is configured to extend the respective first and second side panels for a predetermined distance past the second body end.

8. The vehicle according to claim 2, wherein each of the first and second devices is enclosed by the second fascia.

9. The vehicle according to claim 1, wherein each of the first and second side panels is configured as a pivotably mounted flap positioned flush with an external surface of the second fascia when retracted, and configured to swing out to the respective positions along the first and second lateral body sides.

10. The vehicle according to claim 1, further comprising a first track and a second track positioned at the respective first and second lateral body sides, and wherein each of the first and second side panels is guided by the respective first and second tracks.

11. The vehicle according to claim 1, further comprising an electronic controller configured to regulate the first and second devices to thereby selectively deploy and retract the first and second side panels.

12. A vehicle comprising:
a vehicle body having a first body end configured to face oncoming ambient airflow when the vehicle is in motion relative to a road surface, and also having a second body end opposite of the first body end;
a first lateral body side spanning a distance between the first body end and the second body end;
a second lateral body side spanning the distance between the first body end and the second body end and disposed generally parallel to the first lateral body side;
a first fascia arranged at the first body end, wherein the first fascia directs the oncoming ambient airflow around the first and second lateral body sides;
a second fascia arranged at the second body end;
a first side panel mounted to the vehicle body and configured to selectively deploy into the ambient airflow aft of the second body end in a position along the first lateral body side, and to retract from the ambient airflow;
a second side panel mounted to the vehicle body and configured to selectively deploy into ambient airflow aft of the second body end in a position along the second lateral body side, and to retract from the ambient airflow;
a first device configured to selectively deploy and retract the first side panel and a second device configured to selectively deploy and retract the second side panel; and
an electronic controller configured to regulate the first and second devices to thereby selectively deploy and retract the first and second side panels above a predetermined velocity of the vehicle;
wherein the first side panel and the second side panel provide an active lengthening of the vehicle body aft of the second body end to thereby reduce aerodynamic drag when each of the first and second side panels is deployed and positioned along the respective first and second lateral body sides;
wherein each of the first and second side panels selectively extends out of and retracts into the second fascia; and
wherein each of the first and second devices is enclosed by the second fascia.

13. The vehicle according to claim 12, further comprising a first track and a second track positioned at the respective first and second lateral body sides, and wherein each of the first and second side panels is guided by the respective first and second tracks.

14. The vehicle according to claim 12, wherein each of the first and second devices is a linear actuator.

15. The vehicle according to claim 12, wherein each of the first and second devices is an electric motor.

16. The vehicle according to claim 12, wherein each of the first and second devices includes a multiple-lever linkage configured to apply a force to the respective first and second side panels.

17. The vehicle according to claim 12, wherein each of the first and second devices is configured to extend the respective first and second side panels for a predetermined distance past the second body end.

18. The vehicle according to claim 12, wherein each of the first and second side panels is configured as a pivotably mounted flap positioned flush with an external surface of the second fascia when retracted, and configured to swing out to the respective positions along the first and second lateral body sides.

* * * * *